Figure 1:
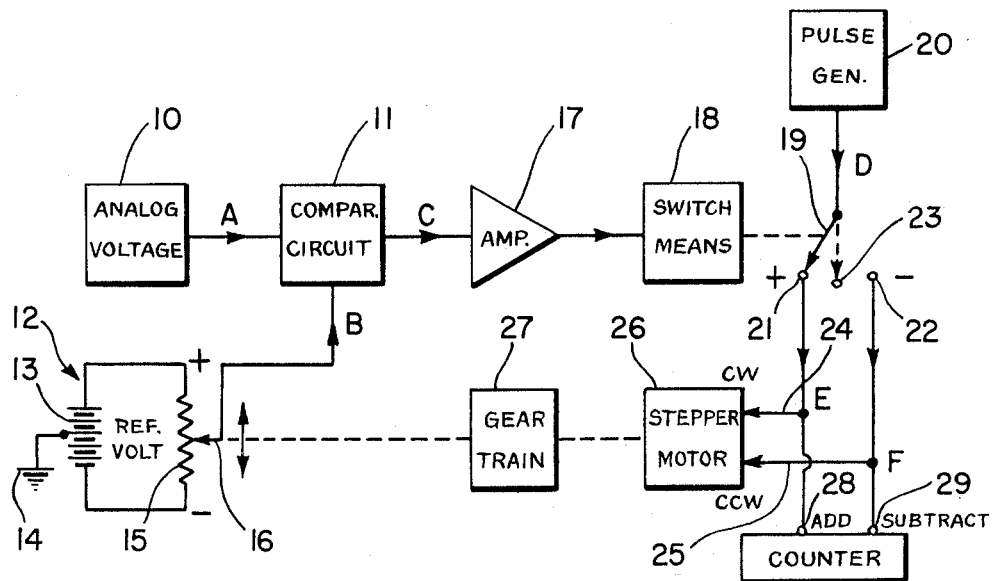

Jan. 4, 1966      E. C. WELCH      3,228,025

ANALOG TO DIGITAL CONVERTER

Filed Feb. 2, 1961

INVENTOR.
ELVIN C. WELCH
BY
Elliott & Pastoriza
ATTORNEYS

United States Patent Office 3,228,025
Patented Jan. 4, 1966

3,228,025
ANALOG TO DIGITAL CONVERTER
Elvin C. Welch, Culver City, Calif., assignor, by mesne assignments, to Barton Instrument Corporation, Montgomery Park, Calif., a corporation of California
Filed Feb. 2, 1961, Ser. No. 86,620
3 Claims. (Cl. 340—347)

This invention relates generally to systems for converting analog signals into digital signals and more particularly to a novel circuit for providing a number of output pulses constituting a function of the magnitude of an input voltage.

Information in the form of digital signals is, in many instances, preferable to representation of the information by an analog type signal. For example, the output of a temperature transducer may constitute a relatively slowly varying D.-C. signal or voltage level. If the transducer is in a missile and it is desired to telemeter the temperature changes back to earth, it would be preferable to first convert the slowly varying D.-C. output signal into digital form prior to transmission through the telemetering system. This is because measurement of a transmitted absolute amplitude and subsequent relative changes in amplitude cannot be achieved with a high degree of accuracy because of atmospheric interference and noise during transmission. On the other hand, if the analog signal is converted into digital form, for example, a series of pulses, the particular amplitude or pulse shape is of no consequence, only the number of pulses received determining the information conveyed by the signal. Equipment for detecting and counting pulses, the number of which is independent of atmospheric interference and noise, is far more accurate than equipment for detecting voltage levels and changes in such voltage levels.

With the foregoing in mind, the present invention has as its primary object the provision of a simple and accurate analog to digital converter for providing a number of output pulses which constitutes a function of the magnitude of an input voltage such as might be received from a transducer.

More particularly, it is an object to provide an analog to digital converter which will provide a continuous indication in digital form of both the polarity and magnitude of a varying input voltage.

Another object is to provide an improved analog to digital converter incorporating a minimum number of relatively inexpensive components without sacrifice of accuracy.

Another object is to provide an analog to digital converter which avoids the use of complicated logic circuits to the end that the requirement for a large number of vacuum tubes or semi-conductor devices such as switching transistors and diodes are avoided.

Briefly, these and other objects and advantages of this invention are attained by providing a combination electrical-mechanical converting system which will provide the desired end result of a series of pulses proportional to the magnitude of an analog input voltage. Basically, the converter includes a comparing circuit for receiving the analog voltage level to be converted together with a reference voltage from an internal source. The analog voltage and reference voltage are compared to provide a control voltage. Also included is a pulse generator for generating continuously a series of output pulses. A stepper motor having its output shaft connected to the source of reference voltage is provided to vary the magnitude of the reference voltage applied to the comparing circuit. The control voltage from the comparing circuit, in turn, is connected to operate a switch means for applying pulses from the pulse generator to the stepper motor only when the control voltage is present.

With the foregoing arrangement, an analog voltage received in the comparing circuit will initially operate the switch means to apply pulses to the stepper motor. Operation of the stepper motor in turn will vary the reference voltage applied to the comparing circuit in a manner to null the applied analog voltage and thus the control voltage from the comparing circuit is reduced to zero. At this point, the switch means is opened, and pulses from the pulse generator to the stepper motor are blocked. The number of pulses required to operate the stepper motor to null the analog voltage then constitutes a function of the initial amplitude of the analog voltage. By connecting a counter to the input terminal of the stepper motor receiving pulses from the pulse generator when the switch means is closed, a visual or recorded indication of the total number of pulses is provided.

In the case of a telemetering operation, the pulses themselves may be transmitted directly and totaled at a ground station.

Figure 2:
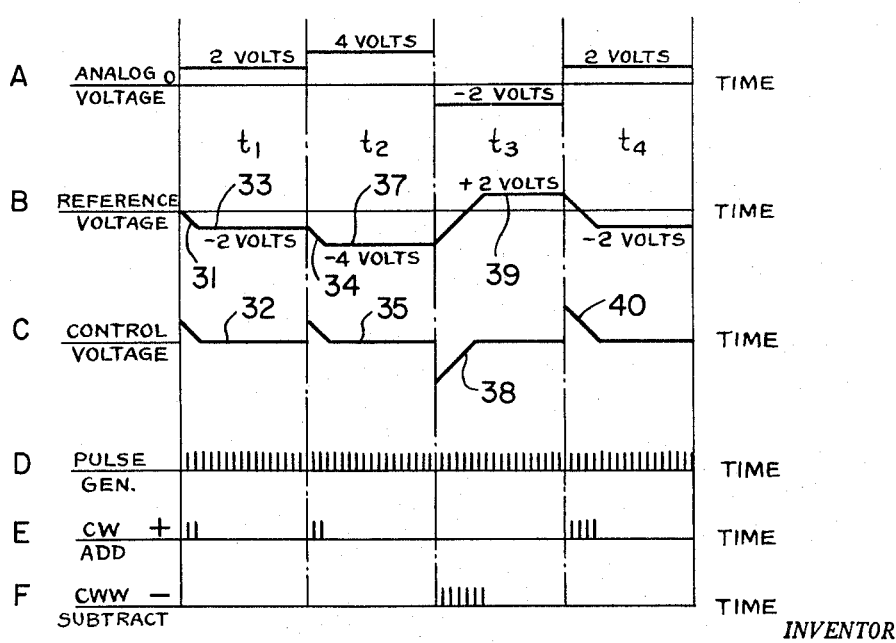

A better understanding of the invention will be had by referring to one embodiment thereof as illustrated in the accompanying drawings, in which:

FIGURE 1 is a schematic block diagram of the analog to digital converter of this invention; and, FIGURE 2 is a series of lettered wave forms as would appear at correspondingly lettered points in the block diagram of FIGURE 1.

Referring first to FIGURE 1, there is shown a source of analog voltage 10 which may constitute any type of transducer providing a variable electrical output voltage signal in response to a varying physical condition. As shown, the analog voltage signal from the transducer 10 passes to a comparing circuit 11. A source of reference potential designated generally by the numeral 12, in turn, is arranged to pass a reference voltage to the comparing circuit 11 for comparison with the analog voltage from the transducer 10.

In the embodiment shown in FIGURE 1, this source of reference potential may comprise a battery 13 center tapped to ground at 14. A potentiometer resistance 15, in turn, is connected across the battery as shown so that center tapping by arm 16 from the center of the resistance 15 will provide a zero voltage, movement of the arm 16 below the center will provide an increasingly negative voltage, and movement of the arm 16 above the center will result in an increasingly positive reference voltage.

The comparing circuit may constitute a simple summing circuit which will provide the sum of the reference voltage and analog voltage in the form of a control voltage passed through an amplifier 17 to a switch means 18. The function of the switch means 18 is depicted schematically by means of a switch arm 19 connected to a pulse generator 20 providing a series of pulses continuously at a given frequency. The arm 19, as shown, is arranged to connect to a positive input terminal 21 when in one position, a negative input terminal 22 when in a second position, or to engage an open contact 23 when in a third position. The particular position of the switch arm 19 will be determined by the polarity of the control voltage passed from the amplifier 17 to the switch means 18. When this control voltage is zero, the switch arm 19 is moved to its center or dotted line position on the open terminal 23.

The terminals 21 and 22 of the switch means connect to the clockwise and counterclockwise rotation inputs 24 and 25 of a stepper motor 26. The output shaft of the stepper motor 26 in turn passes through a gear train 27 and thence is mechanically connected to the arm 16 of the reference potential source 12 to vary the reference voltage applied to the comparing circuit 11 by moving the arm 16 in either an up or down direction. In the particular circuit illustrated in FIGURE 1, the connections are such that pulses received on the clockwise rotation input 24 of the stepper motor 26 will cause the potentiometer arm 16 to move downwardly, thereby providing a more negative reference voltage. Receipts of pulses on the counterclockwise rotation input terminal 25 of the stepper motor 26, on the other hand, will rotate the stepper motor shaft in the opposite direction to cause the potentiometer arm 16 to move upwardly, thereby providing a more positive reference voltage.

Also connected to the plus and minus terminals 21 and 22 for the switch arm 19 are add and subtract input terminals 28 and 29 for a counter 30. With these connections, the counter will provide a total number of counts equal to the number of pulses received at the clockwise rotation terminal 24 of the stepper motor 26 less the number of pulses received at the counterclockwise rotation terminal 25 of the stepper motor 26.

Referring now to the various curves A, B, C, D, E, and F of FIGURE 2, the operation of the circuit of FIGURE 1 will be readily understood. The various wave forms shown correspond to those that would appear at the correspondingly lettered points in the block diagram of FIGURE 1. If it is assumed that an analog voltage level change of one volt will result in the provision of one pulse, the actual number of pulses counted will equal the voltage of the analog voltage.

Thus, with reference first to the top wave form A, there is shown a varying input analog voltage to the comparing circuits 11 which, at the time $t_1$, $t_2$, $t_3$, and $t_4$, is assumed to have amplitude levels of plus two volts, plus four volts, minus two volts, and plus two volts, respectively. Assume at the start of the time interval $t_1$ the reference voltage arm 16 is at the center of the resistance 15 so that the reference voltage is zero. The comparing circiut will then provide a voltage control at its output corresponding to the sum of the analog voltage and reference voltage.

At the beginning of the time interval $t_1$, this control voltage is plus two volts and this signal will be amplified in the amplifier 17 and received in the switch means 18 to cause the switch arm 19 to engage the terminal 21.

With swtich arm 19 on terminal 21, the pulses from the pulse generator 20 will be passed to the clockwise rotation input 24 of the stepper motor 26, thereby rotating the shaft of the stepper motor and through the gear train 27 causing the potentiometer arm 16 to commence moving downwardly as indicated by the small arrow. The reference voltage will thus change from zero towards a negative value as indicated at 31 in wave form B of FIGURE 2. When the reference voltage attains a value of minus two volts, it will exactly balance the analog voltage of plus two volts, thereby reducing the control voltage at the output of the comparing circuit 11 to zero, as indicated at 32 in the wave form C for the control voltage. With zero control voltage, the switch means 18 will release the switch arm 19 to its center position as indicated in dotted lines on the open terminal 23, thereby blocking any further pulses from the pulse generator 20 from passing to the stepper motor. With the stepper motor stopped, the arm 16 will remain at a point on the resistance 15 providing a continuous reference voltage equal to minus two volts as indicated by the level portion 33 of the wave form B.

If it is now assumed at the time interval $t_2$ that the analog voltage increases two additional volts to provide a total of four volts, the control voltage C will then have a of four volts, the control voltage C will then have a value of plus two volts after summing with the minus two volts reference voltage. This control voltage again will move the switch arm 19 to the terminal 21 to again operate the stepper motor to change the reference voltage towards minus four volts as indicated at 34 in FIGURE 2. When the reference voltage equals minus four volts, it will null the analog voltage of plus four volts to again reduce the control voltage to zero as indicated by the level portion 35 in the wave form C. With the control voltage again at zero, the arm 19 will return its open position on the terminal 23 to block further pulses from passing to the stepper motor which will then stop and hold the arm 16 at the minus four volts level. This latter condition is indicated by the minus four volt level portion 37 in wave form B of FIGURE 2.

If now the analog input voltage changes from plus four volts to minus two volts, the resulting control signal from the comparing circuit will be of negative polarity and amplitude as illustrated at 38 in the wave form C of FIGURE 2 to throw the switch arm 19 to the negative terminal 23 and pass pulses from the pulse generator to the counterclockwise rotation input of the stepper motor 26. Rotation of the stepper motor in a counterclockwise direction will then move the potentiometer arm 16 upwardly. When the reference voltage value has a value of plus two volts to null out the minus two volts value of the anolog voltage, the control voltage will be zero and switch arm 19 will open the block further pulses from the stepper motor. Therefore, the arm 16 will be stopped at a point where the reference voltage is plus two volts as indicated at 39 in wave form B.

Finally, during time interval $t_4$, the analog voltage changes from minus two volts to plus two volts resulting in an initial four volt control voltage as indicated by the wave form C at 40. Switch arm 19 will thus be closed on the plus terminal 21 and again cause the stepper motor to step in a clockwise direction to move the arm 16 downwardly until the reference voltage is minus two volts to null out the plus two volts and result in a control voltage of zero. At this time, the arm 19 will be moved to the center open terminal 23 and further pulses will be blocked from the stepper motor.

Wave form D in FIGURE 2 represents the continuous series of pulses provided by the pulse generator 20 and wave form E shows the plus pulses applied to the clockwise rotation input terminal 24 of the stepper motor during the intervals of time $t_1$, $t_2$, and $t_4$. Wave form F shows the pulses during the interval of time $t_3$ applied to the counterclockwise rotation terminal 25.

As described in FIGURE 1, the pulses applied to the clockwise rotation terminal 24 are also passed to the add input terminal 28 of the counter 30. Similarly, the pulses applied to the counterclockwise rotation terminal 25 are passed to the subtract input terminal 29 of the counter 30. Therefore, the counter 30 will read at the time $t_1+2$ pulses indicating that the amplitude of the analog voltage during the time interval $t_1$ is two volts. At the time $t_2$ two additional plus pulses will be added to the counter making a total of +4 pulses indicated by the counter which will show that the amplitude of the analog input voltage is four volts. At the time $t_3$, there will be passed six negative pulses to the counter which will subtract from the +4 pulses showing in the counter to provide a net count of −2 pulses corresponding to the minus two volt value of the analog voltage during the time interval $t_3$. Finally, when the analog voltage rises to plus two volts, four positive pulses will be added to the counter 30 to provide a net reading of +2 pulses.

Thus, it will be clear that the reading of pulses on the counter 30 at any time will indicate the voltage level of the analog voltage at such time. The frequency response of the system is determined by the slope of the reference voltage wave form as indicated at the points 31 and 34, for example. That is, it is determined by the rate at which the reference voltage can be changed by the stepper motor to null out the analog voltage. This rate of operation may be made relatively rapid for most types of contemplated analog voltages which ordinarily would not change rapidly. Thus, for proper operation, it is only necessary that the slope of the analog voltage at no time be greater than the slope defined by changes in the reference voltage.

While only one particular embodiment has been set forth and described, many modifications and substitutions of components may be made without departing from the scope and spirit of this invention. For example, simple switching transistors may be employed in place of the schematic switch arm 19 and switch terminals 21, 22, and 23.

The analog to digital converter is therefore not to be thought of as limited to the one embodiment set forth merely for illustrative purposes.

What is claimed is:

1. An analog to digital converter comprising, in combination: a comparing circuit for receiving an analog voltage; a source of reference potential connected to said comparing circuit to provide a reference voltage magnitude for comparison with the magnitude of said analog voltage; a pulse generator providing a series of pulses; a stepper motor having an output shaft connected to said source of reference potential for varying the magnitude of said reference voltage in a given direction and through a given range determined by the direction and number of degrees of movement of said output shaft, said stepper motor including a clockwise rotation input and a counterclockwise rotation input, pulses received at said clockwise rotation input causing said reference voltage to vary in one direction and pulses received at said counterclockwise rotation input causing said reference voltage to vary in an opposite direction; and switch means connecting said pulse generator to said stepper motor in response to the presence of a control voltage from said comparing circuit to pass pulses to said clockwise rotation input when said control voltage is of one polarity and to said counterclockwise rotation input when said control voltage is of an opposite polarity to rotate said shaft in a direction determined by the polarity of said control voltage and thereby vary the reference voltage in a proper direction to null said analog voltage, said switch means opening when said control voltage is reduced to zero whereby the pulses passed to said stepper motor during the time interval required to null said analog voltage is a function of the magnitude of said analog voltage.

2. An analog to digital converter according to claim 1, including totalizing means having add and subtract input terminals connected to receive pulses passed to said clockwise and counterclockwise rotation inputs of said stepper motor respectively for providing a running total equal to the number of pulses applied to said clockwise rotation input less the number of pulses applied to said counterclockwise rotation input.

3. An analog to digital converter according to claim 2, including an amplifier connected between said comparing circuit and said switch means to amplify said control voltage.

References Cited by the Examiner

UNITED STATES PATENTS

| | | | |
|---|---|---|---|
| 2,775,754 | 12/1956 | Sink | 340—347 |
| 2,988,737 | 6/1961 | Schroeder | 340—347 |
| 3,010,059 | 11/1961 | McLaughlin et al. | 318—29 |
| 3,024,399 | 3/1962 | Valentino | 310—49 |
| 3,063,018 | 11/1962 | Gorden et al. | 340—347 |
| 3,113,302 | 12/1963 | Goodman | 340—347 |

OTHER REFERENCES

Pages 5–55 thru 5–56, 1956, Notes on Analog-Digital Conversion Techniques, Alfred R. Susskind.

MALCOLM A. MORRISON, *Primary Examiner.*

STEPHEN W. CAPELLI, *Examiner.*